United States Patent
Schoeley et al.

(10) Patent No.: US 7,582,717 B2
(45) Date of Patent: Sep. 1, 2009

(54) CROSSLINKABLE COMPOSITION BASED ON ORGANOSILICON COMPOUNDS

(75) Inventors: Peter Schoeley, Diera-Zehren (DE);
Herbert Soellradl, Emmerting (DE);
Marko Prasse, Glaubitz (DE)

(73) Assignee: Wacker Chemie AG, Munich (DE)

( * ) Notice: Subject to any disclaimer, the term of this patent is extended or adjusted under 35 U.S.C. 154(b) by 461 days.

(21) Appl. No.: 11/639,804

(22) Filed: Dec. 15, 2006

(65) Prior Publication Data

US 2007/0142597 A1 Jun. 21, 2007

(30) Foreign Application Priority Data

Dec. 19, 2005 (DE) .................. 10 2005 060 649

(51) Int. Cl.
*C08L 83/04* (2006.01)

(52) U.S. Cl. ................ 528/29; 525/477; 528/34

(58) Field of Classification Search ............ None
See application file for complete search history.

(56) References Cited

U.S. PATENT DOCUMENTS

| | | | |
|---|---|---|---|
| 4,304,897 A | 12/1981 | Bluestein et al. | |
| 5,561,184 A | 10/1996 | Miyoshi et al. | |
| 6,406,794 B1 * | 6/2002 | Shiota et al. | 428/447 |
| 6,642,352 B2 * | 11/2003 | Suzuki et al. | 528/502 R |

FOREIGN PATENT DOCUMENTS

| | | |
|---|---|---|
| DE | 39 22 079 C1 | 7/1990 |
| EP | 0 731 142 A2 | 9/1996 |
| EP | 0 857 760 A1 | 8/1998 |
| JP | 6-65495 A * | 3/1994 |
| JP | 2006-182957 A * | 7/2006 |
| WO | WO 2004/056905 A1 | 7/2004 |

OTHER PUBLICATIONS

Patbase abstract corresponding to DE 39 22 079 Cl, (Jul. 1990).

* cited by examiner

*Primary Examiner*—Marc S Zimmer
(74) *Attorney, Agent, or Firm*—Brooks Kushman P.C.

(57) ABSTRACT

Crosslinkable compositions based on organosilicon compounds contain at least one compound of the formula $$H(OCH_2CH_2)_n(OCHCH_3CH_2)_p(OCH_2CH_2)_mOH \qquad (III)$$

and/or a reaction product thereof with hydrolyzable organosilicon compound(s), where
n is 0 or an integer from 1 to 30,
m is 0 or an integer from 1 to 30, and
the sum of n and m is greater than 5, and
p is 1, 2, or 3. The compositions have superior application properties as compared to similar compositions without compound III.

14 Claims, No Drawings

CROSSLINKABLE COMPOSITION BASED ON ORGANOSILICON COMPOUNDS

BACKGROUND OF THE INVENTION

1. Field of the Invention

The invention relates to crosslinkable compositions based on organosilicon compounds with very good handling properties during use, to processes for preparation thereof, and also to the use thereof.

2. Description of the Related Art

Single-component sealing compositions which can be stored if water is excluded but which on ingress of water vulcanize at room temperature to give elastomers are known. Large amounts of these products are used, for example, in the construction industry. These mixtures are based on polymers which have terminal silyl groups bearing reactive substituents such as OH groups or hydrolyzable groups, e.g. alkoxy groups or acetoxy groups. These sealing compositions can moreover comprise fillers, plasticizers, crosslinking agents, catalysts, and also additives. Additives in sealing compositions not only optimize selected aspects of performance of the cured product, but can also improve the specific properties of the sealing composition during the curing process and indeed during the application process.

The sealing compositions are usually expressed from tubes, cartridges or tubular bags, and then smoothed within a joint with the finger or with a smoothing aid. They remain in the joint without substantially changing shape until complete curing has occurred. Rheology additives which have an effect on the physical stability of uncured sealing compositions are described, for example, in U.S. Pat. No. 4,304,897. The polyether silicone copolymers described therein reduce the flow properties of silicone sealing compositions, the result being that they have no or only minimal flow under the influence of gravity, i.e. under the influence of very small shear forces.

The paste-like sealing composition must meet stringent requirements during the application process. For example, when the sealing composition is smoothed by the finger or by a smoothing tool it is desirable to provide maximum resistance, in order that the jointing process can be optimized. This resistance can be measured by technical methods, by measuring the force needed by a prescribed shaped object to achieve a certain depth of penetration. Another technical term used for resistance during smoothing is "body". Users of sealing compositions often complain of insufficient "body". Once the smoothing process has ended, it is desired that the sealing composition releases from the smoothing tool without extended stringing, thus permitting clean finishing of the joint.

EP-A 857 760 describes a wide variety of non-ionic compounds for reducing the level of stringing of silicone sealing compositions, inter alia polyethylene-polypropylene block copolymers. The property known as "body", i.e. the resistance of the sealing composition during the jointing process described above, is not improved thereby, or at least not substantially so. To achieve sufficient resistance to deformation of the sealing composition, the known nonionic compounds would also have to be present in amounts which markedly impair the adhesion of the sealing composition to substrates. Addition of these amounts is not possible, in practice.

Another known method for increasing resistance to deformation of the uncured sealing composition consists of increasing the proportion of fine-particle fillers which are generally always present. However, the amounts of fine-particle fillers that must be incorporated into the mixtures in order to achieve satisfactory application properties are such that the excessive filler content gives the subsequently cured rubber a level of mechanical properties that is inadequate for jointing applications, examples being excessive hardness or inadequate extensibility.

Achievement of ideal application properties in silicone sealing compositions is rendered yet more difficult overall by the presence, in accordance with the prior art, of non-silicone plasticizers in the sealing compositions. Organic hydrocarbons are generally used, these being obtained from work-up of the appropriate petroleum fractions during distillation. These greatly reduce the resistance which the sealing composition exerts on the tool during smoothing.

SUMMARY OF THE INVENTION

The deficiencies of prior art crosslinkable organosilicon compounds are overcome through the addition to the composition of hydroxyl-functional polyethers having a polyoxypropylene block and at least one external polyoxyethylene block, or a reaction product thereof with hydrolysable organosilicon compounds.

DETAILED DESCRIPTION OF THE PREFERRED EMBODIMENTS

The invention thus provides crosslinkable compositions based on organosilicon compounds, which comprise at least one compound of the formula $$H(OCH_2CH_2)_n(OCHCH_3CH_2)_p(OCH_2CH_2)_mOH \qquad (III)$$

and/or reaction products thereof with hydrolyzable organosilicon compounds, where n is 0 or an integer from 1 to 30, preferably an integer from 1 to 15, m is 0 or an integer from 1 to 30, preferably an integer from 1 to 15, and the sum of n and m is greater than 5, and p is 1, 2, or 3, preferably 1 or 2, and more preferably 1.

The crosslinkable compositions are preferably compositions crosslinkable via a condensation reaction. For the purposes of the present invention, the expression "condensation reaction" is also intended to include any preceding hydrolysis step, and the expression "condensable radicals" also includes radicals which have participated in a preceding hydrolysis step.

The inventive compositions are most preferably those capable of preparation using (A) organosilicon compounds having at least two condensable groups, (B) compounds of the formula (III) and/or reaction products thereof with hydrolyzable organosilicon compounds and, if appropriate, (C) crosslinking agents.

The condensable groups present in the organosilicon compounds and which participate in the crosslinking reaction can be any desired groups, e.g. hydroxy groups, oximato groups, amino groups, and organyloxy groups.

The organosilicon compounds employed in the inventive compositions (A) can be any of the organosilicon compounds having at least two condensable groups, for example those previously used in compositions crosslinkable via a condensation reaction. These can be either pure siloxanes, i.e. ≡Si—O—Si≡ structures or else silcarbanes, i.e. ≡Si—R''—Si≡ structures, R" being a divalent hydrocarbon radical, substituted or unsubstituted or interrupted by heteroatoms, or can be a copolymer having any desired organosilicon groups.

The organosilicon compounds (A) are preferably those containing units of the formula $$R_aY_bSiO_{(4-a-b)/2} \quad (I),$$

where

R are identical or different and are substituted or unsubstituted hydrocarbon radicals which can be interrupted by non-adjacent oxygen atoms, Y are identical or different and are hydroxy radicals or hydrolyzable radicals, a is 0, 1, 2, or 3, preferably 1 or 2, and b is 0, 1, 2, or 3, preferably 0, 1, or 2, preferably 0, with the proviso that the sum of a and b is less than or equal to 4 and at least two Y radicals are present per molecule. The sum of a and b is preferably less than or equal to 3.

The radical R is preferably a monovalent hydrocarbon radical having from 1 to 18 carbon atoms, these preferably being substituted by halogen atoms, amino groups, ether groups, ester groups, epoxy groups, mercapto groups, cyano groups, or (poly)glycol radicals, the latter being composed of oxyethylene units and/or of oxypropylene units, with particular preference given to alkyl radicals having from 1 to 12 carbon atoms, in particular the methyl radical. However, the radical R can also be a divalent radical which, for example, bonds two silyl groups to one another.

Examples of radicals R are alkyl radicals such as the methyl, ethyl, n-propyl, isopropyl, 1-n-butyl, 2-n-butyl-, isobutyl, tert-butyl, n-pentyl, isopentyl, neopentyl, and tert-pentyl radicals; hexyl radicals such as the n-hexyl radical; heptyl radicals such as the n-heptyl radical; octyl radicals such as the n-octyl radical, and isooctyl radicals such as the 2,2,4-trimethylpentyl radical; nonyl radicals such as the n-nonyl radical; decyl radicals such as the n-decyl radical; dodecyl radicals such as the n-dodecyl radical; octadecyl radicals such as the n-octadecyl radical; cycloalkyl radicals, such as the cyclopentyl, cyclohexyl, cycloheptyl and methylcyclohexyl radicals; alkenyl radicals such as the vinyl, 1-propenyl, and 2-propenyl radicals; aryl radicals such as the phenyl, naphthyl, anthryl, and phenanthryl radicals; alkaryl radicals such as the o-, m-, and p-tolyl radicals, xylyl radicals and ethylphenyl radicals; and aralkyl radicals such as the benzyl radical, and the α- and β-phenylethyl radicals. Examples of substituted radicals R are the methoxyethyl, ethoxyethyl, and ethoxyethoxyethyl radicals. Examples of divalent radicals R are polyisobutylenediyl radicals and propanediyl-terminated polypropylene glycol radicals.

Examples of radicals Y are the hydroxy radical, and also any of the hydrolyzable radicals known hitherto, e.g. hydrocarbon radicals which are unsubstituted or substituted and which are bonded to silicon by way of an oxygen atom or nitrogen atom.

The radical Y is preferably a hydroxy radical, an —OR$^1$ radical, where R$^1$ is an unsubstituted or substituted hydrocarbon radical which may be interrupted by non-adjacent oxygen atoms, e.g. the methoxy, ethoxy, n-propoxy, isopropoxy, n-butoxy, isobutoxy, sec-butoxy, tert-butoxy, and 2-methoxyethoxy radicals; acyloxy radicals such as the acetoxy radical; amino radicals such as the methylamino, dimethylamino, ethylamino, diethylamino, and cyclohexylamino radicals; amido radicals such as the N-methylacetamido and benzamido radicals; aminoxy radicals such as the diethylaminoxy radical; oximo radicals such as the methylethylketoximo and methylisobutylketoximo radicals; and enoxy radicals such as the 2-propenoxy radical.

Examples of radicals R$^1$ are the monovalent radicals stated for R. The radical R$^1$ is preferably an alkyl radical having from 1 to 12 carbon atoms, most preferably the methyl or ethyl radical.

The radical Y is most preferably a hydroxy radical, —OR$^1$ radical where R$^1$ has the definition given above, acetoxy radical or oximo radical, and is in particular a hydroxy, methoxy, ethoxy, acetoxy, or methylethylketoximo radical, greatest preference being given to the acetoxy radical.

The organosilicon compounds (A) are most preferably those of the formula $$Y_{3-f}R_fSi\text{—}(SiR_2\text{—}O)_e\text{—}SiR_fY_{3-f} \quad (II),$$

where each of R and Y can be identical or different and has one of the definitions stated above, e is from 30 to 3000, and f is 0, 1 or 2.

f is preferably 2 if Y is —OH, and f is preferably 1 or 0 if Y is a methoxy, ethoxy, or acetoxy radical.

Examples of organosilicon compounds (A) are
(MeO)$_2$MeSiO[SiMe$_2$O]$_{200\text{-}2000}$SiMe(OMe)$_2$,
(AcO)$_2$MeSiO[SiMe$_2$O]$_{200\text{-}2000}$SiMe(OAc)$_2$
(HO)Me$_2$SiO[SiMe$_2$O]$_{200\text{-}2000}$SiMe$_2$(OH),
(EtO)$_2$MeSiO[SiMe$_2$O]$_{200\text{-}2000}$SiMe(OEt)$_2$,
(HO)MeViSiO[SiMe$_2$O]$_{200\text{-}2000}$SiMeVi(OH),
(MeO)$_2$ViSiO[SiMe$_2$O]$_{200\text{-}2000}$SiVi(OMe)$_2$
(AcO)$_2$ViSiO[SiMe$_2$O]$_{200\text{-}2000}$SiVi(OAc)$_2$
(AcO)$_2$EtSiO[SiMe$_2$O]$_{200\text{-}2000}$SiEt(OAc)$_2$
(OX)$_2$MeSiO[SiMe$_2$O]$_{200\text{-}2000}$SiMe(OX)$_2$
(OX)$_2$ViSiO[SiMe$_2$O]$_{200\text{-}2000}$SiVi(OX)$_2$
(OX)$_2$EtSiO[SiMe$_2$O]$_{200\text{-}2000}$SiEt(OX)$_2$
(OX)$_3$SiO[SiMe$_2$O]$_{200\text{-}2000}$Si(OX)$_3$, and
(EtO)$_2$ViSiO[SiMe$_2$O]$_{200\text{-}2000}$SiVi(OEt)$_2$, where Me is methyl radical, Et is ethyl radical, Vi is vinyl radical, Ac is acetoxy radical, and Ox is methylethylketoximato radical.

The viscosity of the organosilicon compounds (A) is preferably from 100 to 10$^6$ mPas, more preferably from 1000 to 350,000 mPas, in each case at 25° C. The organosilicon compounds (A) are commercially available products or can be prepared by methods familiar in silicon chemistry.

Component (B) is preferably a compound of the formula (III), where the OH groups can react entirely or partially with the other constituents of the composition, in particular with crosslinking agent (C), even before the mixing process has ended. However, it is certainly possible to use, as component (B), reaction products of compounds of the formula (III) with hydrolyzable organosilicon compounds, e.g. crosslinking agent (C).

Component (B) is preferably a component of the formula (III) in which the sum of n and m is from 5 to 25, more preferably components in which the sum of n and m is from 10 to 15, particularly, from 12 to 14.

Examples of compounds (B) are
H(OCH$_2$CH$_2$)$_5$(OCHCH$_3$CH$_2$)(OCH$_2$CH$_2$)$_{10}$OH,
H(OCH$_2$CH$_2$)$_6$(OCHCH$_3$CH$_2$)(OCH$_2$CH$_2$)$_7$OH,
H(OCH$_2$CH$_2$)$_5$(OCHCH$_3$CH$_2$)(OCH$_2$CH$_2$)$_{20}$OH,
H(OCH$_2$CH$_2$)$_7$(OCHCH$_3$CH$_2$)(OCH$_2$CH$_2$)$_7$OH,
H(OCH$_2$CH$_2$)$_2$(OCHCH$_3$CH$_2$)(OCH$_2$CH$_2$)$_{12}$OH,
H(OCH$_2$CH$_2$)$_5$(OCHCH$_3$CH$_2$)$_2$(OCH$_2$CH$_2$)$_{10}$OH, H(OCH$_2$CH$_2$)$_6$(OCHCH$_3$CH$_2$)$_2$(OCH$_2$CH$_2$)$_6$OH, and/or reaction products of these with crosslinking agent (C), where preference is given to
H(OCH$_2$CH$_2$)$_5$(OCHCH$_3$CH$_2$)(OCH$_2$CH$_2$)$_{10}$OH,
H(OCH$_2$CH$_2$)$_6$(OCHCH$_3$CH$_2$)(OCH$_2$CH$_2$)$_7$OH,
H(OCH$_2$CH$_2$)$_5$(OCHCH$_3$CH$_2$)(OCH$_2$CH$_2$)$_{20}$OH,
H(OCH$_2$CH$_2$)$_7$(OCHCH$_3$CH$_2$)(OCH$_2$CH$_2$)$_7$OH,
H(OCH$_2$CH$_2$)$_2$(OCHCH$_3$CH$_2$)(OCH$_2$CH$_2$)$_{12}$OH and/or reaction products of these with crosslinking agent (C), and particular preference is given to
H(OCH$_2$CH$_2$)$_6$(OCHCH$_3$CH$_2$)(OCH$_2$CH$_2$)$_7$OH,
H(OCH$_2$CH$_2$)$_7$(OCHCH$_3$CH$_2$)(OCH$_2$CH$_2$)$_7$OH,
H(OCH$_2$CH$_2$)$_2$(OCHCH$_3$CH$_2$)(OCH$_2$CH$_2$)$_{12}$OH and/or reaction products of these with crosslinking agent (C).

Compounds (B) are commercially available products or can be prepared by methods familiar in organic chemistry.

The inventive compositions contain component (B) in amounts which are preferably from 0.01 to 5 parts by weight, more preferably from 0.05 to 1.0 parts by weight, and in particular from 0.1 to 0.7 parts by weight based on 100 parts by weight of organosilicon compound (A).

The crosslinking agents (C) which are optionally used in the inventive compositions can be any desired crosslinking agent having at least three condensable radicals, e.g. silanes or siloxanes having at least three organyloxy groups. The crosslinking agents (C) are preferably organosilicon compounds of the formula $$Z_cSiR^2_{(4-c)} \qquad (IV),$$

where

R$^2$ are identical or different and are monovalent, unsubstituted or substituted hydrocarbon radicals which may be interrupted by non-adjacent oxygen atoms, Z are identical or different, and as described above for Y with the exception of the hydroxy group, and c is 3 or 4, or else partial hydrolyzates of these. The partial hydrolyzates can be partial homohydrolyzates, i.e. partial hydrolyzates of one type of organosilicon compound of the formula (IV), or can be partial cohydrolyzates, i.e. partial hydrolyzates of at least two different types of organosilicon compounds of the formula (IV).

Although this is not stated in formula (IV), the inventive organosilicon compounds used can have a small proportion of hydroxy groups, preferably up to at most 5% of all of the Si-bonded radicals, as a result of the preparation process. If the optional crosslinking agents (C) are partial hydrolyzates of organosilicon compounds of the formula (IV), preference is given to those having up to 6 silicon atoms.

Examples of radical R$^2$ are the monovalent examples for radical R mentioned above, preference being given to hydrocarbon radicals having from 1 to 12 carbon atoms and particular preference being given to the methyl and the vinyl radical.

Examples of Z are the examples stated for Y with the exception of the hydroxy group.

The crosslinking agents (C) are preferably tetramethoxysilane, tetraethoxysilane, tetrapropoxysilane, tetrabutoxysilane, methyltrimethoxysilane, methyltriethoxysilane, vinyltrimethoxysilane, vinyltriethoxysilane, phenyltrimethoxysilane, phenyltriethoxysilane, 3-cyanopropyltrimethoxysilane, 3-cyanopropyltriethoxysilane, 3-(glycidoxy)propyltriethoxysilane, 1,2-bis(trimethoxysilyl)ethane, 1,2-bis(triethoxysilyl)ethane, methyltris(methylethylketoximo)silane, vinyltris(methylethylketoximo)silane, tetrakis(methylethylketoximo)silane, methyltriacetoxysilane, ethyltriacetoxysilane, vinyltriacetoxysilane, dimethyldiacetoxysilane, methylvinyldiacetoxysilane, and also partial hydrolyzates of the organosilicon compounds mentioned, e.g. hexaethoxydisiloxane.

The crosslinking agents (C) are most preferably tetramethoxysilane, tetraethoxysilane, tetrapropoxysilane, methyltrimethoxysilane, methyltriethoxysilane, vinyltrimethoxysilane, vinyltriethoxysilane, phenyltrimethoxysilane, 1,2-bis(trimethoxysilyl)ethane, 1,2-bis(triethoxysilyl)ethane, methyltris(methylethylketoximo)silane, vinyltris(methylethylketoximo)silane, methyltriacetoxysilane, ethyltriacetoxysilane, vinyltriacetoxysilane, and also partial hydrolyzates of these, in particular methyltrimethoxysilane, vinyltriethoxysilane, methyltris(methylethylketoximo)silane, vinyltris(methylethylketoximo)silane, methyltriacetoxysilane, ethyltriacetoxysilane, vinyltriacetoxysilane, and also partial hydrolyzates of these. The crosslinking agents (C) are commercially available products or can be prepared by processes known in silicon chemistry.

If the inventive compositions comprise crosslinking agents (C), the amounts are preferably from 0.01 to 20 parts by weight, more preferably from 0.5 to 10 parts by weight, and in particular from 3 to 8 parts by weight, based on 100 parts by weight of organosilicon compound (A).

In addition to the components (A), (B), and, if appropriate (C), the inventive compositions can also contain any of other conventional additives used in compositions crosslinkable via a condensation reaction, e.g. curing accelerators (D), plasticizers (E), fillers (F), coupling agents (G), and additives (H).

Curing accelerators (D) which can be used include any curing accelerators useful in compositions crosslinkable via a condensation reaction. Examples of curing accelerators (D) are titanium compounds and organotin compounds, e.g. di-n-butyltin dilaurate and di-n-butyltin diacetate, di-n-butyltin oxide, dioctyltin diacetate, dioctyltin dilaurate, dioctyltin oxide, and also reaction products of these compounds with alkoxysilanes such as tetraethoxysilane, preference being given to di-n-butyltin diacetate and dibutyltin oxide in tetraethyl silicate hydrolyzate, particular preference being given to di-n-butyltin oxide in tetraethyl silicate hydrolyzate.

If the inventive compositions comprise a curing accelerator (D), the amounts are preferably from 0.01 to 3 parts by weight, more preferably from 0.05 to 2 parts by weight, based on 100 parts by weight of constituent (A).

Examples of plasticizers (E) are dimethylpolysiloxanes which are liquid at room temperature and which have been end-capped by trimethylsiloxy groups, in particular with viscosities at 25° C. in the range from 50 to 1000 mPas, organopolysiloxanes which are liquid at room temperature and ambient pressure and which are in essence composed of —SiO$_{3/2}$ units and ≡SiO$_{1/2}$ units, known as T and M units, and also high-boiling-point hydrocarbons, e.g. paraffin oils or mineral oils composed in essence of naphthenic and paraffinic units. Plasticizer (E) is preferably a high-boiling-point hydrocarbon or hydrocarbon traction.

The amount of plasticizer (E) present in the inventive compositions is preferably from 0 to 300 parts by weight, more preferably from 10 to 200 parts by weight, and in particular from 20 to 100 parts by weight, based on 100 parts by weight of organosilicon compound (A).

Examples of fillers (F) are nonreinforcing fillers, i.e. fillers whose BET surface area is up to 50 m$^2$/g, e.g. quartz, diatomaceous earth, calcium silicate, zirconium silicate, zeolites, metal oxide powders such as aluminum oxides, titanium oxides, iron oxides, zinc oxides, or mixed oxides of these, barium sulfate, calcium carbonate, gypsum, silicon nitride, silicon carbide, boron nitride, glass powder, and polymer powders such as polyacrylonitrile powder; reinforcing fillers, i.e. fillers whose BET surface area is more than 50 m²/g, such as fumed silica, precipitated silica, precipitated chalk, carbon black such as furnace black and acetylene black, and silicon-aluminum mixed oxides having high BET surface area; fibrous fillers such as asbestos, and also dendritic fibers. The fillers mentioned may have been hydrophobicized, for example via treatment with organosilanes or with organosiloxanes, with stearic acid, or via etherification of hydroxy groups to alkoxy groups. If fillers (F) are used, they are preferably hydrophilic fumed silica and precipitated or ground calcium carbonate.

The amounts of fillers (F) present are preferably from 0 to 300 parts by weight, more preferably from 1 to 200 parts by weight, in particular from 5 to 200 parts by weight, based on 100 parts by weight of organosilicon compound (A).

Examples of coupling agents (G) are silanes and organopolysiloxanes having functional groups, e.g. those having glycidoxypropyl, aminopropyl or methacryloxypropyl radicals. However, if another component, such as an organosilicon compound (A) or a crosslinking agent (C) itself bears one of the functional groups mentioned, it may be possible to omit the addition of coupling agent. The amount of coupling agent present is preferably from 0 to 50 parts by weight, more preferably from 1 to 20 parts by weight, and in particular from 1 to 10 parts by weight, based on 100 parts by weight of organosilicon compound (A).

Examples of additives (H) are pigments, dyes, odorants, oxidation inhibitors, agents for influencing electrical properties, e.g. conductive carbon black, flame-retardant agents, light stabilizers, fungicides, agents for prolonging skinning time, such as silanes having an SiC-bonded mercaptoalkyl radical, cell-generating agents, e.g. azodicarbonamide, heat stabilizers, scavengers, such as silylamides or silazanes containing Si—N, cocatalysts, such as Lewis acids and Brönsted acids, e.g. sulfonic acids, phosphoric acids, phosphoric esters, phosphonic acids and phosphonic esters, agents having thixotropic effect, e.g. phosphoric esters, organic solvents, such as alkyl aromatics, and also any desired siloxanes other than component (A).

Examples of siloxanes that can be used as component (H) are those composed of units of the formula (I) which contain precisely one radical Y per molecule, e.g. monohydroxydiorganopolysiloxanes. These monofunctional siloxanes are preferably used to control modulus. If the inventive compositions comprise additives (H), as is preferred, the amounts are preferably from 0.01 to 100 parts by weight, more preferably from 0.1 to 30 parts by weight, and in particular from 0.3 to 10 parts by weight, based on 100 parts by weight of organosilicon compound (A).

The inventive compositions are most preferably those composed of
(A) organosilicon compounds containing units of the formula (I),
(B) compound(s) of the formula (III) and/or reaction products thereof with hydrolyzable organosilicon compounds,
(C) optionally, crosslinking agents of the formula (IV),
(D) optionally, curing accelerators,
(E) optionally, plasticizers,
(F) optionally, fillers,
(G) optionally, coupling agents, and
(H) optionally, further additives.

The inventive compositions are preferably viscous to pasty compositions.

To provide the inventive compositions, all of the constituents can be mixed with one another in any desired sequence. This mixing can take place at room temperature and at the pressure of the ambient atmosphere, i.e. from about 900 to 1100 hPa. If desired, however, this mixing can also take place at higher temperatures, e.g. at temperatures in the range from 35° C. to 135° C. Another possibility is mixing for a period or entirely under reduced pressure, e.g. at an absolute pressure of from 30 to 500 hPa, in order to remove volatile compounds or air.

Each of the constituents of the inventive compositions can be one type of that constituent or else a mixture composed of at least two different types of these constituents.

The usual water content of air is sufficient for the crosslinking of the inventive compositions. The crosslinking of the inventive compositions preferably takes place at room temperature. It can also be carried out, if desired, at temperatures higher or lower than room temperature, e.g. at from −5° to 15° C. or at from 30° C. to 50° C., and/or by means of water concentrations exceeding the normal water content of air.

The crosslinking is preferably carried out at a pressure of from 100 to 1100 hPa, in particular at the pressure of the ambient atmosphere, i.e. from about 900 to 1100 hPa.

The present invention also provides moldings produced via crosslinking of the inventive compositions.

The inventive compositions can be used for any intended purpose for which it is possible to use compositions which can be stored with exclusion of water and which crosslink to give elastomers at room temperature on ingress of water.

The inventive compositions therefore have excellent suitability, for example as sealing compositions for joints, inclusive of vertically running joints, and for similar cavities whose gap width is, for example, from 10 to 40 mm, e.g. in buildings, in land vehicles, in watercraft, and in aircraft, or as adhesives or putty compositions, e.g. in window construction or in the production of display cabinets, or for example, for the production of protective coatings, inclusive of those for surfaces having continuous exposure to fresh or salt water, of antislip coatings, of elastomeric moldings, or for insulation of electrical or electronic apparatuses.

Advantages of the inventive compositions is that they are easy to prepare and have high resistance to deformation, have very good handling properties during application and have excellent usage properties in a wide variety of applications. A further advantage is that they exhibit very high storage stability and high crosslinking rate. Another advantage is that the amount of stringing which is exhibited during application is small and that once cured, they are characterized by low modulus.

In the examples described below, all viscosities are based on a temperature of 25° C. unless indicated otherwise stated, and the examples are carried out at the pressure of the ambient atmosphere, i.e. at about 1000 hPa, and at room temperature, i.e. at about 23° C., or at a temperature which becomes established when the reactants are combined at room temperature without additional heating or cooling, and at about 50% relative humidity. All of the parts and percentages are moreover based on weight unless otherwise stated.

INVENTIVE EXAMPLE 1

520 g of an α,ω-dihydroxypolydimethylsiloxane whose viscosity is 80,000 mPa·s and 190 g of a hydrocarbon mixture whose kinematic viscosity is 6.2 mm²/s at 40° C., whose viscosity-density constant is 0.79, and whose boiling range is from 300 to 370° C. were mixed for 5 minutes in a planetary-gear mixer with 22 g of ethyltriacetoxysilane and 10 g of methyltriacetoxysilane. 60 g of fumed silica whose specific surface area is 150 m²/g (commercially available as HDK® V15 silica from Wacker Chemie AG, Munich, Germany) were then incorporated. After 20 minutes of in-vacuo homogenization, 2.4 g of polyalkylene glycol composed of about 13 ethylene oxide units and 1 propylene oxide unit with a molecular weight of about 600 g/mol and 0.4 g of dibutyltin diacetate were incorporated by mixing in vacuo. The product prepared was drawn off for storage in moisture-proof packs.

COMPARATIVE EXAMPLE 1A 520 g of an α,ω-dihydroxypolydimethylsiloxane whose viscosity is 80,000 mPa·s and 190 g of a hydrocarbon mixture whose kinematic viscosity is 6.2 mm²/s at 40° C., whose viscosity-density constant is 0.79, and whose boiling range is from 300 to 370° C. were mixed for 5 minutes in a planetary-gear mixer with 22 g of ethyltriacetoxysilane and 10 g of methyltriacetoxysilane. 60 g of fumed silica whose specific surface area is 150 m²/g (commercially available as HDK® V15 silica from Wacker Chemie AG, Munich, Germany) were then incorporated. After 20 minutes of in-vacuo homogenization, 0.4 g of dibutyltin diacetate was incorporated by mixing in vacuo. The product prepared was drawn off for storage in moisture-proof packs.

COMPARATIVE EXAMPLE 1B 520 g of an α,ω-dihydroxypolydimethylsiloxane whose viscosity is 80,000 mPa·s and 190 g of a hydrocarbon mixture whose kinematic viscosity is 6.2 mm²/s at 40° C., whose viscosity-density constant is 0.79, and whose boiling range is from 300 to 370° C. were mixed for 5 minutes in a planetary-gear mixer with 22 g of ethyltriacetoxysilane and 10 g of methyltriacetoxysilane. 60 g of fumed silica whose specific surface area is 150 m²/g (commercially available as HDK® V15 silica from Wacker Chemie AG, Munich, Germany) were then incorporated. After 20 minutes of in-vacuo homogenization, 2.4 g of polyethylene glycol whose molecular weight is about 600 g/mol and 0.4 g of dibutyltin diacetate were incorporated by mixing in vacuo. The product prepared was drawn off for storage in moisture-proof packs.

COMPARATIVE EXAMPLE 1C 520 g of an α,ω-dihydroxypolydimethylsiloxane whose viscosity is 80,000 mPa·s and 190 g of a hydrocarbon mixture whose kinematic viscosity is 6.2 mm²/s at 40° C., whose viscosity-density constant is 0.79, and whose boiling range is from 300 to 370° C. were mixed for 5 minutes in a planetary-gear mixer with 22 g of ethyltriacetoxysilane and 10 g of methyltriacetoxysilane. 60 g of fumed silica whose specific surface area is 150 m²/g (commercially available as HDK® V15 silica from Wacker Chemie AG, Munich, Germany) were then incorporated. After 20 minutes of in-vacuo homogenization, 2.4 g of polypropylene glycol whose molecular weight is about 725 g/mol and 0.4 g of dibutyltin diacetate were incorporated by mixing in vacuo. The product prepared was drawn off for storage in moisture-proof packs.

All of the sealing compositions prepared had a skinning time of 20 minutes (25° C., 50% relative humidity) and cured within 7 days (25° C., 50% relative humidity) to give elastomeric material whose Shore A hardness is 20 (ISO 868).

The uncured specimens were characterized by performance testing at 25° C. The results are given in Table 1.

The expression rate was determined from 310 ml PE cartridges using an expression pressure of 2.5 bar and a nozzle diameter of 3.0 mm.

To determine the resistance of the sealing compositions to deformation, a hemisphere of diameter of 25 mm with 5 mm of cylindrical extension was pressed into a 50 ml PE beaker with the aid of a Zwick tester. Each measurement began immediately after bubble-free uncured sealing composition had been charged to the beaker and the surface had been leveled.

To determine stringing, the length traveled by the hemisphere prior to breakaway of the adhering sealing composition was determined when the hemisphere was withdrawn after penetrating 20 mm into the sealing composition.

TABLE 1

|  | Expression rate in g/min | Maximum penetration force in g | Stringing in mm |
| --- | --- | --- | --- |
| Inventive example 1 | 85 | 336 | 11 |
| Comparative example 1A | 102 | 232 | 17 |
| Comparative example 1B | 97 | 333 | 14 |
| Comparative example 1C | 94 | 253 | 14 |

The mixture of inventive example 1 shows the desired small amount of stringing together with a high penetration force. The expression rate also has a desirably low value.

INVENTIVE EXAMPLE 2

470 g of an α,ω-dihydroxypolydimethylsiloxane whose viscosity is 80,000 mPa·s and 240 g of a trimethylsilyl-end capped polydimethylsiloxane whose viscosity is 1000 mPa·s were mixed for 5 minutes in a planetary-gear mixer with 24 g of ethyltriacetoxysilane and 12 g of methyltriacetoxysilane. 60 g of fumed silica whose specific surface area is 150 m²/g (commercially available as HDK® V15 silica from Wacker Chemie AG, Munich, Germany) were then incorporated. After 20 minutes of in-vacuo homogenization, 2.4 g of polyalkylene glycol composed of about 13 ethylene oxide units and 1 propylene oxide unit with a molecular weigh of about 600 g/mol and 0.4 g of dibutyltin diacetate were incorporated by mixing in vacuo. The product prepared was drawn off for storage in moisture-proof packs.

COMPARATIVE EXAMPLE 2A 470 g of an α,ω-dihydroxypolydimethylsiloxane whose viscosity is 80,000 mPa·s and 240 g of a trimethylsilyl-end capped polydimethylsiloxane whose viscosity is 1000 mPa·s were mixed for 5 minutes in a planetary-gear mixer with 24 g of ethyltriacetoxysilane and 11 g of methyltriacetoxysilane. 60 g of fumed silica whose specific surface area is 150 m²/g (commercially available with trademark HDK® V15 from Wacker Chemie AG, Munich, Germany) were then incorporated. After 20 minutes of in-vacuo homogenization, 0.4 g of dibutyltin diacetate was incorporated in vacuo. The product prepared was drawn off for storage in moisture-proof packs.

The two sealing compositions prepared had a skinning time of 20 minutes (25° C., 50% relative humidity) and cured within 7 days (25° C., 50% relative humidity) to give elastomeric material with Shore A hardness of 21 (ISO 868).

The uncured specimens were characterized by performance testing at 25° C. as described in inventive example 1. The results are given in Table 2.

TABLE 2

|  | Expression rate in g/min | Maximum penetration force in g | Stringing in mm |
|---|---|---|---|
| Inventive example 2 | 53 | 437 | 12 |
| Comparative example 2A | 65 | 320 | 14 |

The mixture of inventive example 2 has the desired high penetration force with minimal expression rate.

INVENTIVE EXAMPLE 3

480 g of a polydimethylsiloxane mixture in which the siloxanes are terminated by dimethoxymethylsilyl and/or dimethoxyvinylsilyl groups, the ratio of dimethoxymethylsilyl end groups to dimethoxyvinylsilyl end groups is about 1:1, and having a viscosity of 80,000 mPa·s, 175 g of a trimethylsilyl-end capped polydimethylsiloxane whose viscosity is 1000 mPa·s, 40 g of a hydrocarbon mixture whose kinematic viscosity is 6.2 mm$^2$/s at 40° C., whose viscosity-density constant is 0.79, and whose boiling range is from 300 to 370° C., 25 g of methyltrimethoxysilane, 20 g of a coupling agent prepared via reaction of 1 part of aminopropyltriethoxysilane with 1 part of methyltriethoxysilane hydrolyzate with an ethoxy content of 37%, and 7 g of aminopropyltrimethoxysilane are mixed with one another in a planetary-gear mixer and stirred for 15 minutes. The mixture is then completed via homogeneous incorporation of 63 g of fumed silica whose specific surface area is 150 m$^2$/g, 1.5 g of octylphosphonic acid, 2.4 g of polyalkylene glycol, composed of about 13 ethylene oxide units and 1 propylene oxide unit, having a molecular weight of about 600 g/mol, and 2.8 g of tin catalyst prepared via reaction of di-n-butyltin diacetate and tetraethoxysilane. The product prepared was drawn off for storage in moisture-proof packs.

COMPARATIVE EXAMPLE 3A 560 g of a polydimethylsiloxane mixture in which the siloxanes are terminated by dimethoxymethylsilyl and/or dimethoxyvinylsilyl groups, the ratio of dimethoxymethylsilyl end groups to dimethoxyvinylsilyl end groups is about 1:1, and having a viscosity of 80,000 mPa·s, 90 g of a trimethylsilyl-end capped polydimethylsiloxane whose viscosity is 1000 mPa·s, 40 g of a hydrocarbon mixture whose kinematic viscosity is 6.2 mm$^2$/s at 40° C., whose viscosity-density constant is 0.79, and whose boiling range is from 300 to 370° C., 25 g of methyltrimethoxysilane, 20 g of a coupling agent prepared via reaction of 1 part of aminopropyltriethoxysilane with 1 part of methyltriethoxysilane hydrolyzate with ethoxy content of 37%, and 7 g of aminopropyltrimethoxysilane are mixed with one another in a planetary-gear mixer and stirred for 15 minutes. The mixture is then completed via homogeneous incorporation of 63 g of fumed silica whose specific surface area is 150 m$^2$/g, 1.5 g of octylphosphonic acid and 2.8 g of a tin catalyst prepared via reaction of di-n-butyltin diacetate and tetraethoxysilane. The product prepared was drawn off for storage in moisture-proof packs.

The two sealing compositions prepared had a skinning time of 10 minutes (25° C., 50% relative humidity) and cured within 7 days (25° C., 50% relative humidity) to give elastomeric material with Shore A hardness of 19 (ISO 868).

The uncured specimens were characterized by performance testing at 25° C. as described in inventive example 1. The results are given in Table 3.

TABLE 3

|  | Expression rate in g/min | Maximum penetration force in g | Stringing in mm |
|---|---|---|---|
| Inventive example 3 | 62 | 432 | 11 |
| Comparative example 3A | 77 | 366 | 12 |

The mixture of inventive example 3 has the desired high penetration force with minimal expression rate.

INVENTIVE EXAMPLE 4

300 g of a polydimethylsiloxane mixture in which the siloxanes are terminated by dimethoxymethylsilyl and/or dimethoxyvinylsilyl groups, the ratio of dimethoxymethylsilyl end groups to dimethoxyvinylsilyl end groups is about 1:1, and having a viscosity of 300,000 mPa·s, 180 g of a trimethylsilyl-end capped polydimethylsiloxane whose viscosity is 1000 mPa·s, 25 g of methyltrimethoxysilane and 20 g of a coupling agent prepared via reaction of 1 part of aminopropyltriethoxysilane with 1 part of methyltriethoxysilane hydrolyzate with ethoxy content of 37% are mixed with one another in a planetary-gear mixer and stirred for 15 minutes. The mixture is then completed via homogeneous incorporation of 240 g of ground calcium carbonate whose average particle diameter is 5 micrometers, 40 g of fumed silica whose specific surface area is 150 m$^2$/g, 1.5 g of octylphosphonic acid, 2.4 g of polyalkylene glycol, composed of about 13 ethylene oxide units and 1 propylene oxide unit, whose molecular weight is about 600 g/mol, and 2.8 g of tin catalyst prepared via reaction of di-n-butyltin diacetate and tetraethoxysilane. The product prepared was drawn off for storage in moisture-proof packs.

COMPARATIVE EXAMPLE 4A 300 g of a polydimethylsiloxane mixture in which the siloxanes are terminated by dimethoxymethylsilyl and/or dimethoxyvinylsilyl groups, the ratio of dimethoxymethylsilyl end groups to dimethoxyvinylsilyl end groups is about 1:1, and having a viscosity of 300,000 mPa·s, 180 g of a trimethylsilyl-end capped polydimethylsiloxane whose viscosity is 1000 mPa·s, 25 g of methyltrimethoxysilane and 20 g of a coupling agent prepared via reaction of 1 part of aminopropyltriethoxysilane with 1 part of methyltriethoxysilane hydrolyzate with ethoxy content of 37% are mixed with one another in a planetary-gear mixer and stirred for 15 minutes. The mixture is then completed via homogeneous incorporation of 240 g of ground calcium carbonate whose average particle diameter is 5 micrometers, 40 g of fumed silica whose specific surface area is 150 m$^2$/g, 2.0 g of octylphosphonic acid and 2.0 g of a tin catalyst prepared via reaction of di-n-butyltin diacetate and tetraethoxysilane. The product prepared was drawn off for storage in moisture-proof packs.

The two sealing compositions prepared had a skinning time of 10 minutes (25° C., 50% relative humidity) and cured within 7 days (25° C., 50% relative humidity) to give elastomeric material with Shore A hardness of 20 (ISO 868).

The uncured specimens were characterized by performance testing at 25° C. as described in inventive example 1. The results are given in Table 4.

TABLE 4

|  | Expression rate in g/min | Maximum penetration force in g | Stringing in mm |
|---|---|---|---|
| Inventive example 4 | 36 | 302 | 23 |
| Comparative example 4A | 41 | 230 | 30 |

The mixture of inventive example 4 has the desired high penetration force with minimal expression rate and reduced stringing.

INVENTIVE EXAMPLE 5

420 g of an α,ω-dihydroxypolydimethylsiloxane whose viscosity is 80,000 mPa·s and 260 g of a trimethylsilyl-end capped polydimethylsiloxane whose viscosity is 1000 mPa·s were mixed for 5 minutes in a planetary-gear mixer with 36 g of methyltributanonoximosilane and 4 g of tetrabutanonoximosilane. 64 g of fumed silica whose specific surface area is 150 m²/g (commercially available as HDK® V15 silica from Wacker Chemie AG, Munich, Germany) were then incorporated. After 20 minutes of in-vacuo homogenization, 2.4 g of polyalkylene glycol composed of about 13 ethylene oxide units and 1 propylene oxide unit with a molecular weight of about 600 g/mol and 15 g of a coupling agent prepared via reaction of 1 part of aminopropyltriethoxysilane with 1 part of methyltriethoxysilane hydrolyzate whose ethoxy content is 37%, and 0.4 g of a tin catalyst prepared via reaction of di-n-butyltin diacetate and tetraethoxysilane were incorporated by mixing in vacuo. The product prepared was drawn off for storage in moisture-proof packs.

COMPARATIVE EXAMPLE 5A 420 g of an α,ω-dihydroxypolydimethylsiloxane whose viscosity is 80,000 mPa·s and 260 g of a trimethylsilyl-end capped polydimethylsiloxane whose viscosity is 1000 mPa·s were mixed for 5 minutes in a planetary-gear mixer with 36 g of methyltributanonoximosilane and 4 g of tetrabutanonoximosilane. 64 g of fumed silica whose specific surface area is 150 m²/g (commercially available as HDK® V15 silica from Wacker Chemie AG, Munich, Germany) were then incorporated. After 20 minutes of in-vacuo homogenization, 15 g of a coupling agent prepared via reaction of 1 part of aminopropyltriethoxysilane with 1 part of methyltriethoxysilane hydrolyzate whose ethoxy content is 37%, and 0.4 g of a tin catalyst prepared via reaction of di-n-butyltin diacetate and tetraethoxysilane were incorporated by mixing in vacuo. The product prepared was drawn off for storage in moisture-proof packs.

The two sealing compositions prepared had a skinning time of 15 minutes (25° C., 50% relative humidity) and cured within 7 days (25° C., 50% relative humidity) to give elastomeric material with Shore A hardness of 20 (ISO 868).

The uncured specimens were characterized by performance testing at 25° C. as described in inventive example 1. The results are given in Table 5.

TABLE 5

|  | Expression rate in g/min | Maximum penetration force in g | Stringing in mm |
|---|---|---|---|
| Inventive example 5 | 37 | 456 | 16 |
| Comparative example 5A | 39 | 396 | 18 |

The mixture of inventive example 5 has the desired high penetration force with minimal expression rate and relatively little stringing.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed:

1. A crosslinkable organosilicon composition comprising at least one compound of the formula $$H(OCH_2CH_2)_n(OCHCH_3CH_2)_p(OCH_2CH_2)_mOH \qquad (III),$$

a reaction product thereof with hydrolyzable organosilicon compound(s), or a mixture thereof, wherein
n is 0 or an integer from 1 to 30,
m is 0 or an integer from 1 to 30, and
the sum of n and m is greater than 5, and
p is 1, 2, or 3.

2. The crosslinkable composition of claim 1, wherein p is equal to 1 or 2.

3. The crosslinkable composition of claim 1, wherein p is equal to 1.

4. The crosslinkable composition of claim 2, wherein the sum of n and m is from 10 to 15.

5. The crosslinkable composition of claim 1, which is a condensation crosslinkable composition.

6. The crosslinkable composition of claim 2, which is a condensation crosslinkable composition.

7. The crosslinkable composition of claim 3, which is a condensation crosslinkable composition.

8. The crosslinkable composition of claim 4, which is a condensation crosslinkable composition.

9. The crosslinkable composition of claim 1, comprising
(A) at least one organosilicon compound having at least two condensable groups,
(B) at least one compound of the formula (III), a reaction product thereof with hydrolyzable organosilicon compound(s) or a mixture thereof, and, (C) a crosslinking agent.

10. The crosslinkable composition of claim 8, which comprises from 0.01 to 5 parts by weight of component (B), based on 100 parts by weight of organosilicon compound (A).

11. The crosslinkable composition of claim 1, comprising
(A) at least one organosilicon compound containing units of the formula (I), $$R_aY_bSiO_{(4-a-b)/2} \qquad (I),$$

where
R are identical or different and are substituted or unsubstituted hydrocarbon radicals optionally interrupted by non-adjacent oxygen atoms,
Y are identical or different and are hydroxy radicals or hydrolyzable radicals, a is 0, 1, 2, or 3, and b is 0, 1, 2, or 3, with the proviso that the sum of a and b is less than or equal to 4 and at least two Y radicals are present per molecule, and (B) at least one compound of the formula (III), a reaction product thereof with hydrolyzable organosilicon compound(s) or a mixture thereof, and (C) a crosslinking agent of the formula (IV),

$$Z_c SiR^2_{(4-c)} \qquad (IV),$$

wherein $R^2$ are identical or different monovalent optionally substituted hydrocarbon radicals optionally containing non-adjacent oxygen atoms, Z are identical or different hydrolysable radicals other than hydroxyl radicals, and c is 3 or 4 or partial hydrolysates thereof, (D) optionally, a curing accelerator, (E) optionally, a plasticizer, (F) optionally, a filler, and (G) optionally a coupling agent.

12. A molding, produced by crosslinking a composition of claim 1.

13. A molding, produced by crosslinking a composition of claim 9.

14. A molding, produced by crosslinking a composition of claim 11.

* * * * *